(12) United States Patent
Zhong

(10) Patent No.: US 7,530,881 B2
(45) Date of Patent: May 12, 2009

(54) ECCENTRIC STROKE ADJUSTING MECHANISM

(75) Inventor: Chen Cheng Zhong, Suzhou (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 0 days.

(21) Appl. No.: 11/346,624

(22) Filed: Feb. 2, 2006

(65) Prior Publication Data

US 2006/0189267 A1   Aug. 24, 2006

(30) Foreign Application Priority Data

Feb. 4, 2005   (CN)   ......................... 2005 1 0038340

(51) Int. Cl.
    *B24B 23/03*   (2006.01)
(52) U.S. Cl. .......................... 451/11; 451/357; 451/359
(58) Field of Classification Search .................. 451/357,
    451/359, 353, 344, 11, 270
    See application file for complete search history.

(56) References Cited

U.S. PATENT DOCUMENTS

| | | | |
|---|---|---|---|
| 2,270,816 A | 1/1942 | Zonis | |
| 3,499,347 A | 3/1970 | Pearson | |
| 4,610,111 A | * 9/1986 | Cox | ............................ 451/357 |
| 4,744,177 A | 5/1988 | Braun et al. | |
| 5,947,804 A | 9/1999 | Fukinuki et al. | |

FOREIGN PATENT DOCUMENTS

| | | | |
|---|---|---|---|
| DE | 4202724 A1 | 8/1993 | |
| EP | 0820838 B2 | 7/1997 | |
| FR | 580647 | 11/1924 | |
| GB | 932100 | 7/1963 | |
| JP | 2001-179591 | * 7/2001 | ................. 451/357 |

* cited by examiner

*Primary Examiner*—Robert Rose
(74) *Attorney, Agent, or Firm*—Pate Pierce & Baird

(57) ABSTRACT

The present invention relates to an eccentric stroke adjusting mechanism for use in a power tool with a principle drive shaft comprising a first and a second eccentric member mounted on the principle drive shaft respectively and a coupling member for connecting the first and the second eccentric member. The principle drive shaft has a central axis. The first eccentric member has a first central axis and the second eccentric member has a second central axis. The eccentric stroke of the first central axis and the second central axis with respect to a central axis of the principle drive shaft is adjustable. The eccentric stroke adjusting mechanism of the invention is reliable and the adjusted eccentricity is non-displaceable. The eccentric stroke adjusting mechanism can be applied to adjust the eccentric stroke of single disk or multiple (e.g., double) disks.

19 Claims, 8 Drawing Sheets

N — N

ECCENTRIC STROKE ADJUSTING MECHANISM

BACKGROUND

1. Field of the Invention

The present invention relates to an eccentric stroke adjusting mechanism for use in a power tool and to a power tool per se.

2. Background Art

As illustrated in U.S. Pat. No. 4,744,177 and EP-A-0820838, known abrasive power tools such as sanders and grinders generally comprise a housing, a motor vertically located inside the housing, a principle drive shaft, a working (sanding) plate and an eccentric stroke adjusting mechanism. The eccentric stroke adjusting mechanism is used to adjust the vibration amplitude of the working (sanding) plate to meet different requirements of different workpieces. The eccentric stroke adjusting mechanism comprises an eccentric shaft securely attached to the principle drive shaft, an eccentric driving device and a bearing for connecting the eccentric driving device and the working (sanding) plate. However such an eccentric stroke adjusting mechanism is not easily and reliably balanced and the adjusted eccentricity is easy to displace. Furthermore the eccentric stroke adjusting mechanism can only be applied to adjust single disk working (sanding) plate.

OBJECTS AND SUMMARY OF THE INVENTION

An object of the present invention is to provide a reliable and widely applicable eccentric stroke adjusting mechanism.

In an embodiment, the present invention provides an eccentric stroke adjusting mechanism for use in a power tool with a principle drive shaft. The eccentric stroke adjusting mechanism may comprise a first and a second eccentric member mounted on the principle drive shaft and a coupling member for coupling the first and the second eccentric members. The first eccentric member may have a first central axis and the second eccentric member may have a second central axis. The eccentricity of the first central axis and the second central axis with respect to a central axis of the principle drive shaft is adjustable.

The eccentric stroke adjusting mechanism of the invention advantageously prevents adjusted eccentricity from being easily displaced and is more reliable. More particularly, the relationship and co-action between the first eccentric member, the second eccentric member and the coupling member prevents the adjusted eccentricity from displacement. The eccentric stroke adjusting mechanism can be applied to adjust the eccentric stroke of a single disk or multiple (e.g., double) disks.

Viewed from a first aspect, the present invention provides an eccentric stroke adjusting mechanism for use in a power tool, the eccentric stroke adjusting mechanism comprising:

a principle drive shaft with a central axis;

a first eccentric member mounted radially on the principle drive shaft, the first eccentric member having a first central axis;

a second eccentric member mounted radially on the principle drive shaft, the second eccentric member having a second central axis; and a coupling member for coupling the first eccentric member to the second eccentric member, wherein the eccentricity of the first central axis and the eccentricity of the second central axis with respect to the central axis of the principle drive shaft are adjustable.

In a preferred embodiment, the first eccentric member has a first eccentric sleeve and the second eccentric member has a second eccentric sleeve. The first eccentric sleeve of the first eccentric member and the second eccentric sleeve of the second eccentric member are rotatable relative to the principle drive shaft, wherein a central axis of the first eccentric sleeve is the first central axis of the first eccentric member and a central axis of the second eccentric sleeve is the second central axis of the second eccentric member.

Particularly, the first eccentric member preferably has a first eccentric shaft, the second eccentric member has a second eccentric shaft and the first eccentric shaft and second eccentric shaft are securely mounted radially on the principle drive shaft, wherein the first eccentric sleeve and the second eccentric sleeve are rotatably mounted on the first eccentric shaft and the second eccentric shaft respectively, wherein a central axis of the first eccentric shaft and a central axis of the second eccentric shaft are eccentric with respect to the central axis of the principle drive shaft, wherein the central axis of the first eccentric sleeve is eccentric with respect to the central axis of the first eccentric shaft and to the central axis of the principle drive shaft and wherein the central axis of the second eccentric sleeve is eccentric with respect to the central axis of the second eccentric shaft and to the central axis of the principle drive shaft.

A first sanding plate may be operably connected or coupled to the first eccentric sleeve so that in practice the central axis of the first eccentric sleeve is the central axis of the first eccentric member and of the first sanding plate. Similarly a second sanding plate may be operably connected or coupled to the second eccentric sleeve so that in practice the central axis of the second eccentric sleeve is the central axis of the second eccentric member and of the second sanding plate.

Preferably, the central axis of the first eccentric sleeve and the central axis of the second eccentric sleeve are on opposite sides of the central axis of the principle drive shaft. The central axis of the first eccentric sleeve and the central axis of the second eccentric sleeve may be parallel to the central axis of the principle drive shaft. The central axis of the first eccentric sleeve, the central axis of the second eccentric sleeve and the central axis of the principle drive shaft may be in a common plane. The central axis of the first eccentric sleeve and the central axis of the second eccentric sleeve may be equidistant from the central axis of the principle drive shaft. The central axis of the first eccentric sleeve and the central axis of the second eccentric sleeve may be angularly displaced relative to the central axis of the principle drive shaft by 180°.

Preferably, the central axis of the first eccentric shaft and the central axis of the second eccentric shaft are on opposite sides of the central axis of the principle drive shaft. The central axis of the first eccentric shaft and the central axis of the second eccentric shaft may be parallel to the central axis of the principle drive shaft. The central axis of the first eccentric shaft, the central axis of the second eccentric shaft and the central axis of the principle drive shaft may be in a common plane. The central axis of the first eccentric shaft and the central axis of the second eccentric shaft may be equidistant from the central axis of the principle drive shaft. The central axis of the first eccentric shaft and the central axis of the second eccentric shaft may be angularly displaced relative to the central axis of the principle drive shaft by 180°.

In an embodiment, the first eccentric sleeve and second eccentric sleeve may be substantially cylindrical and may terminate in a radial collar.

A bearing may be tightly mounted radially on the second eccentric sleeve. A bearing seat may be mounted around the perimeter of the bearing. A sanding plate may be fastened to the bearing seat.

Preferably, the coupling member is securely mounted on the first eccentric shaft and has a first pin on an upper surface and a second pin on a lower surface, wherein each of the first eccentric sleeve and the second eccentric sleeve has a radial slot to receive the first pin and second pin respectively, wherein the width of the slot approximates to the diameter of the pin. To mount the coupling member on the first eccentric shaft, the first eccentric shaft may comprise an annular protrusion on its lower face.

The coupling member preferably has an operating body rotatably mounted on the principle drive shaft and an extension pin extending axially from the operating body, wherein each of the first eccentric sleeve and the second eccentric sleeve has a receiving bore for receiving the extension pin, wherein the diameter of the receiving bore approximates to the diameter of the extension pin and the receiving bore is longer than the extension pin.

Preferably, a plurality of locating sockets are formed on the outer surface of the first eccentric shaft and of the second eccentric shaft and a plurality of receiving recesses are formed on the inner circumferential surface of the first eccentric sleeve and of the second eccentric sleeve, wherein in each receiving recess is seated an elastic element (e.g., a spring) connected to a locating post, wherein each locating post is selectively received in a locating socket so as to restrainedly couple the first and the second eccentric sleeve with the first and the second eccentric shaft respectively.

Viewed from a further aspect, the present invention provides a power tool comprising:
- a housing;
- a rotary motor in the housing; and
- an eccentric stroke adjusting mechanism as hereinbefore defined.

Preferably, the power tool further comprises a first sanding plate connected or coupled to the first eccentric member. The power tool may further comprise a second sanding plate connected or coupled to the second eccentric member.

The first sanding plate and second sanding plate may terminate at the base of housing. The first sanding plate and second sanding plate may be an outer sanding and an inner sanding plate. The or each sanding plate may be annular (e.g., stepped annular).

Preferably, the power tool further comprises a principle drive shaft locking device. In an embodiment, the principle drive shaft locking device may comprise:
- a chuck mounted radially on the principle drive shaft, wherein the chuck has a skirt extending axially downwardly from its circumferential edge, wherein a plurality of recesses are located around the skirt; and
- a locking member attached to the housing, wherein the locking member is selectively insertable into a recess to lock the chuck and prevent the principle drive shaft from rotating.

More preferably, the power tool may comprise: a balancing drum, wherein the chuck has a central aperture surrounded by an eccentric hub and the balancing drum is securely mounted on the eccentric hub.

A plurality of spaced apart location holes may be formed around the eccentric hub. The balancing drum may comprise a central aperture bound by a hub.

In an embodiment of the present invention, the power tool further comprises:

a clutch securely mounted radially on the first eccentric member (e.g., the first eccentric sleeve), wherein the clutch comprises an annular main body, wherein the annular main body has an inner circumferential surface with a plurality of first truncated conical recesses formed thereon and an outer circumferential surface with a plurality of second truncated conical recesses formed thereon, wherein in each first truncated conical recess and second truncated conical recess is seated an elastic element (e.g., a spring) connected to a roller whereby the elastic element urges the roller outwardly, wherein when in use the principle drive shaft rotates the rollers in the inner circumferential surface of the clutch securely engage the principle drive shaft and the rollers in the outer circumferential surface of the clutch disengage the first sanding plate.

The annular main body may abut an end face of the balancing drum (e.g., the hub). The balancing drum may have a part radial recess extending from the hub. A spring and a ball head locating post connected to the spring may be disposed in the recess. The ball head locating post may be urged partly into a location hole on the eccentric hub to restrainedly couple the balancing drum and the chuck.

The annular main body may abut an end face of the chuck (e,g, the eccentric hub). The annular main body may have a radial recess. A spring and a ball head locating post connected to the spring may be disposed in the recess. The ball head locating post may be urged partly into a location hole on the eccentric hub to restrainedly couple the clutch and the chuck.

In the base of each truncated conical recess, there may be a narrow receiving bore. The elastic element may be received in the receiving bore. An axial projection may extend from the lower face of the annular main body. The axial projection may engage a recess in the upper end of the first eccentric sleeve to securely connect the clutch and the first eccentric sleeve.

Preferably, the principle drive shaft is locked by the principle drive shaft locking device to adjust the eccentric stroke of the sanding plate, the first sanding plate securely engages the rollers seated in the outer circumferential surface of the clutch and the rollers seated in the inner circumferential surface of the clutch disengage the principle drive shaft. Particularly preferably the power tool further comprises: an outer race mounted radially on the annular main body between the clutch and the first sanding plate. A sanding plate may be mounted radially on the outer race. A support bearing may be radially mounted on the first eccentric sleeve. The support bearing may be substantially axially aligned with the outer race. The sanding plate may be radially mounted on the outer race and the bearing.

The power tool may further comprise: a balancing block connected or coupled to the second eccentric member.

The present invention will now be described in a non-limitative sense with reference to the accompanying Figures.

DETAILED DESCRIPTION OF THE PREFERRED EMBODIMENTS

Figure 1:
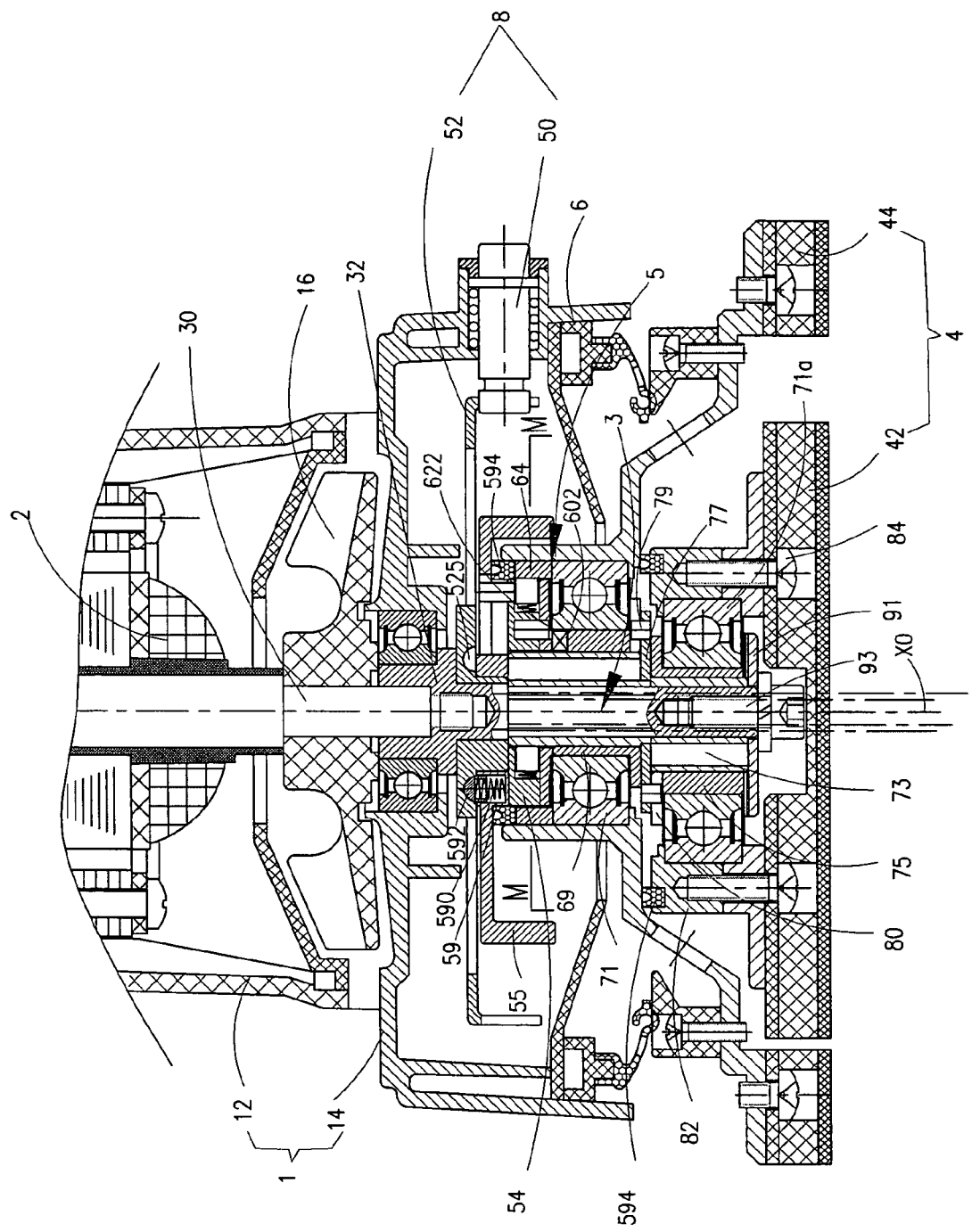
FIG. 1 is a sectional view of a sander according to a first embodiment of the present invention.
Figure 2:
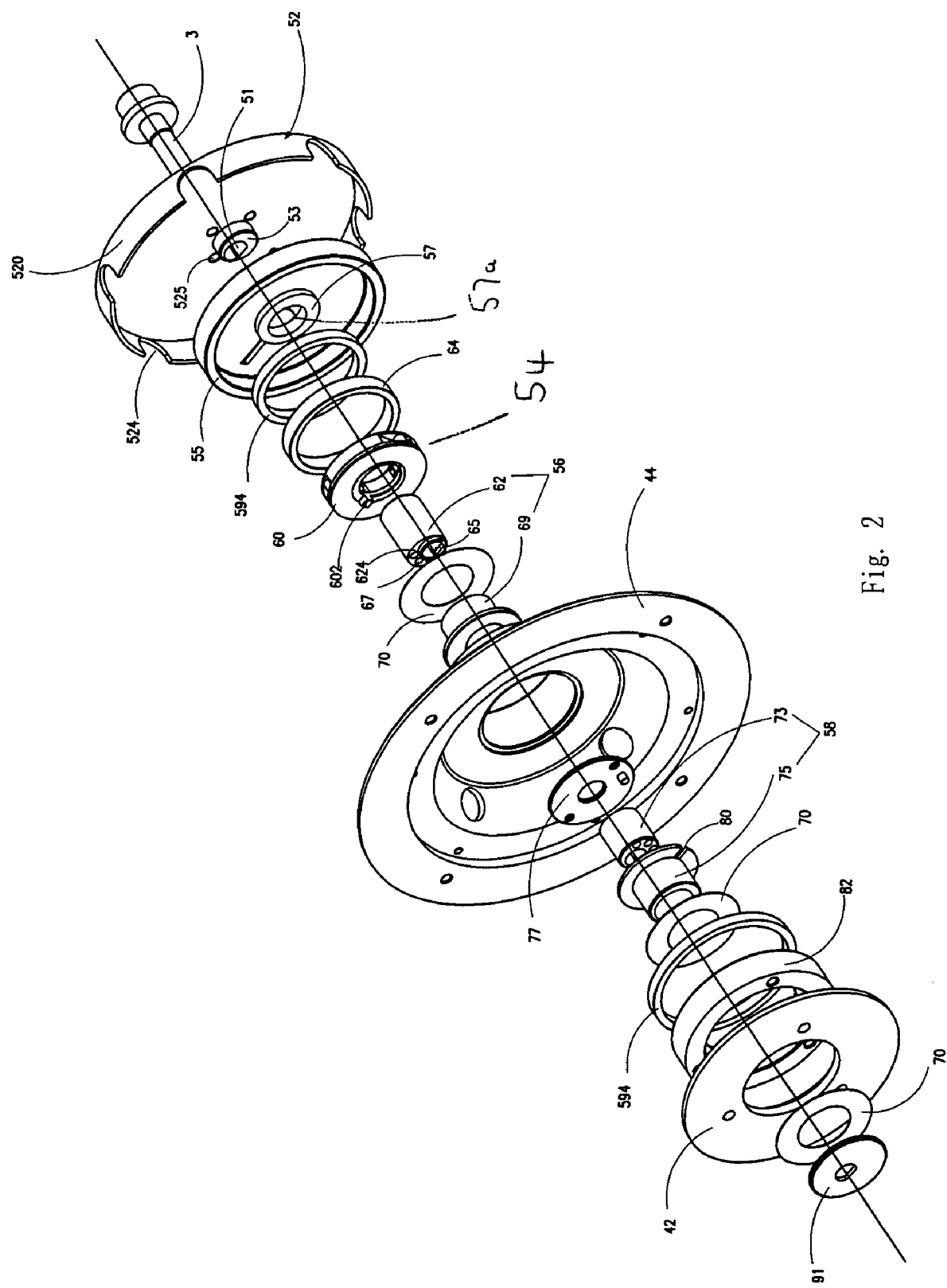
FIG. 2 is a partially exploded view of the sander of FIG. 1.
Figure 3:
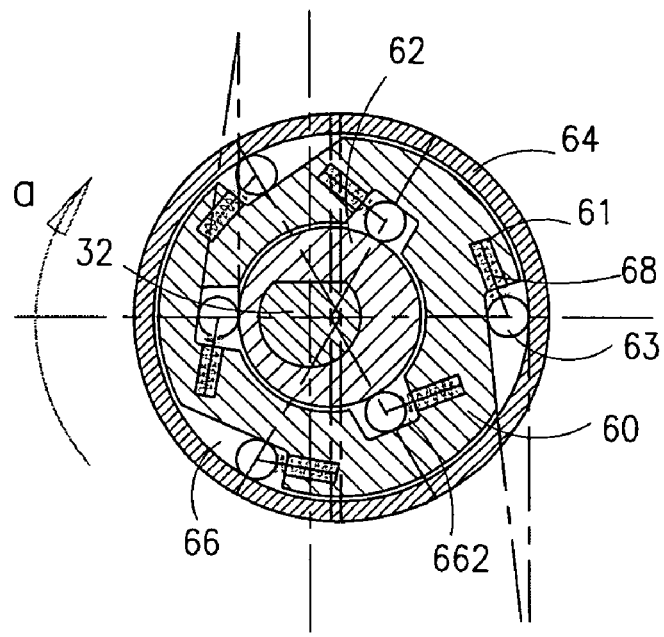
FIG. 3 is a sectional view taken along line M-M shown in FIG. 1.

Referring to FIG. 1, a first embodiment of the present invention is a rotary sander. The sander comprises generally a housing 1, a motor 2 vertically disposed inside the housing 1, a principle drive shaft 3, a sanding plate 4 at the base of the housing and an eccentric stroke adjusting mechanism 5.

Referring to FIGS. 2-5, the housing 1 comprises an upper housing part 12 and a lower housing part 14 securely connected to each other. A fan 16 is securely attached to the principle drive shaft 3. The principle drive shaft 3 comprises an armature shaft 30 and a connecting shaft 32 connected to the lower end of the armature shaft 30. The connecting shaft 32 and the armature shaft 30 have a common axis X0. The connecting shaft 32 has an irregular cross-section. The sanding plate 4 has an annular inner plate 42 and an annular outer plate 44. A braking system 6 is disposed between the lower housing part 14 and the annular outer plate 44.

The eccentric stroke adjusting mechanism 5 comprises a principle drive shaft locking device 8, a first eccentric member 56, a second eccentric member 58 and a coupling member 77 for coupling the first eccentric member 56 and the second eccentric member 58. The first eccentric member 56, the coupling member 77 and the second eccentric member 58 are radially mounted on the connecting shaft 32 in sequence downwardly.

The principle drive shaft locking device 8 comprises a chuck 52 mounted radially on an upper part of the connecting shaft 32 and a bolt member 50. The chuck 52 has a skirt 520 extending axially downwardly from its circumferential edge. A plurality of recesses 524 are distributed around the skirt 520. The bolt member 50 is attached to the lower housing part 14 and can be selectively inserted into a corresponding recess 524 to lock the chuck 52 during adjustment of the eccentric stroke of the sanding plate 4 (as described below). The chuck 52 has a substantially central aperture 51 surrounded by an eccentric hub 53. A plurality of spaced apart location holes 525 are formed in the eccentric hub 53.

A balancing drum 55 is mounted on the eccentric hub 53 so as to cooperate with the annular inner plate 42 whereby to balance the weight of the annular outer plate 44. The balancing drum 55 comprises a central aperture 57a bound by a hub 57. The balancing drum 55 has a part radial recess 59 extending from the hub 57. A spring 590 and a ball head locating post 592 connected to the spring 590 are disposed in the recess 59. The ball head locating post 592 extends partially into a location hole 525 under the force of the spring 590 to restrainedly couple the balancing drum 55 and the chuck 52.

The rotary sander of the first embodiment of the present invention further comprises an overrun clutch 54. The overrun clutch 54 is a one way rotation clutch with a self-locking function. The overrun clutch 54 has an annular main body 60 abutting an end face of the hub 57. An outer race 64 is mounted radially on the annular main body 60 between the overrun clutch 54 and the annular outer plate 44. A locking ring 594 is interposed axially between the outer race 64 and the balancing drum 55. The annular main body 60 has an inner circumferential surface with three first truncated conical recesses 662 formed thereon and an outer circumferential surface with three second truncated conical recesses 66 formed thereon. In the base of each of the first truncated conical recess 662 and second truncated conical recess 66 is a narrow receiving bore 61. A loaded spring 68 is disposed in each narrow receiving bore 61 and individually connects to a roller 63 seated in the conical recess 66, 662. The loaded spring 68 urges the roller 63 away from the narrow receiving bore 61. An axial projection 602 extends from the lower surface of the annular main body 60 adjacent to the inner circumferential surface.

The first eccentric member 56 is radially mounted on the principle drive shaft 3. The first eccentric member 56 comprises a first eccentric shaft 62 having a first bore 65 formed along an axis parallel to its central axis X3. The shape of the first bore 65 matches the shape of the connecting shaft 32 so that the first eccentric shaft 62 can be securely mounted radially on the connecting shaft 32. The central axis X3 is eccentric with respect to the central axis X0. On the upper end of the first eccentric shaft 62 is radially mounted the overrun clutch 54. The first eccentric member 56 further comprises a first eccentric sleeve 69 which is rotatably mounted on a lower end of the first eccentric shaft 62. The first eccentric sleeve 69 has a central axis X1 and the eccentricity of the central axis X1 with respect to the central axis X0 of the principle drive shaft 3 is adjustable. The central axis X1 is eccentric with respect to the central axis X3.

A support bearing 71 is tightly mounted on the first eccentric sleeve 69 and its outer surface is substantially aligned with the outer surface of the outer race 64. The annular outer plate 44 is tightly engaged with the outer surface of the outer race 64 and of the support bearing 71. The central axis of the annular outer plate 44 is coincident with the central axis X1 of the first eccentric sleeve 69 and so the central axis X1 defines in practice the central axis of the first eccentric member 56 as a whole. A washer 70 is disposed axially between the annular main body 60 and the support bearing 71. The end of the first eccentric sleeve 69 abuts the lower face of the washer 70 and has a recess 622 formed on its upper end to receive the projection 602 so that the first eccentric sleeve 69 is securely connected to the overrun clutch 54. The first eccentric shaft 62 has a plurality of bores 67 extending parallel to its central axis X3 to reduce its weight.

The second eccentric member 58 is constructed substantially symmetrically to the first eccentric member 56 with respect to the principle drive shaft 3. The second eccentric member 58 comprises a second eccentric shaft 73 securely mounted radially on the connecting shaft 32 and a second eccentric sleeve 75 rotatably mounted on the second eccentric shaft 73. A central axis X4 of the second eccentric shaft 73 and the central axis X3 of the first eccentric shaft 62 are symmetrically distributed around the central axis X0. A central axis X2 of the second eccentric sleeve 75 and the central axis X1 of the first eccentric sleeve 69 are symmetrically distributed around the central axis X0. The central axis X2 defines in operation the central axis of the second eccentric member 58 as a whole.

The coupling member 77 is mounted on an annular protrusion 624 formed on the bottom face of the first eccentric shaft 62. The coupling member 77 has a first and second pin 79 formed respectively on its top surface and bottom surface. The first and second pin 79 are symmetrically distributed with respect to the central axis of the coupling member 77. The first eccentric sleeve 69 and the second eccentric sleeve 75 each has a radial slot 80 to receive a corresponding pin 79. The width of the slot 80 approximates to the diameter of the pin 79.

A bearing 71 is tightly mounted radially on the second eccentric sleeve 75. A bearing seat 82 is mounted around the perimeter of the bearing 71. A plurality of bolts fasten the annular inner plate 42 to the bearing seat 82. The annular inner plate 42 and the second eccentric sleeve 75 are coaxial. A guard 91 is mounted on the bottom end of the connecting shaft 32 to retain the second eccentric member 58 and a bolt 93 is fastened tightly thereto.

When the eccentric stroke of the sanding plate 4 is to be adjusted, the bolt member 50 is inserted into a corresponding recess 524 of the chuck 52 so as to prevent the principle drive shaft 3 from rotating. The annular outer plate 44 is rotated in the direction indicated by an arrow a in FIG. 3. The outer race 64 rotates together with the annular outer plate 44. Friction between the outer race 64 and the roller 63 of the overrun clutch 54 causes the first eccentric sleeve 69, the second eccentric sleeve 75 and the annular inner plate 42 to rotate accordingly. By virtue of the fact that the annular outer plate 44 is securely coupled to and coaxial with the first eccentric sleeve 69, the central axis X1 of the annular outer plate 44 rotates around the central axis X3 of the first eccentric shaft 62. Since the central axis X0 of the principle drive shaft 3 is fixed, the distance between the central axis X1 and X0 (i.e., the eccentric stroke of the annular outer plate 44) changes. The eccentric stroke of the central axis X2 of the annular inner plate 42 with respect to the central axis X0 also changes and approximates to the eccentric stroke of the annular outer plate 44. The overrun clutch 54, the spring 590 and the ball head locating post 592 disposed between the balancing drum 55 and the chuck 52 prevent the adjusted eccentric stroke from displacement. According to the requirements of the workpiece, the eccentric stroke adjusting mechanism 5 can adjust the eccentric stroke of more than one sanding plate 42, 44 at the same time and can ensure that the sander is balanced during operation.

Figure 6:
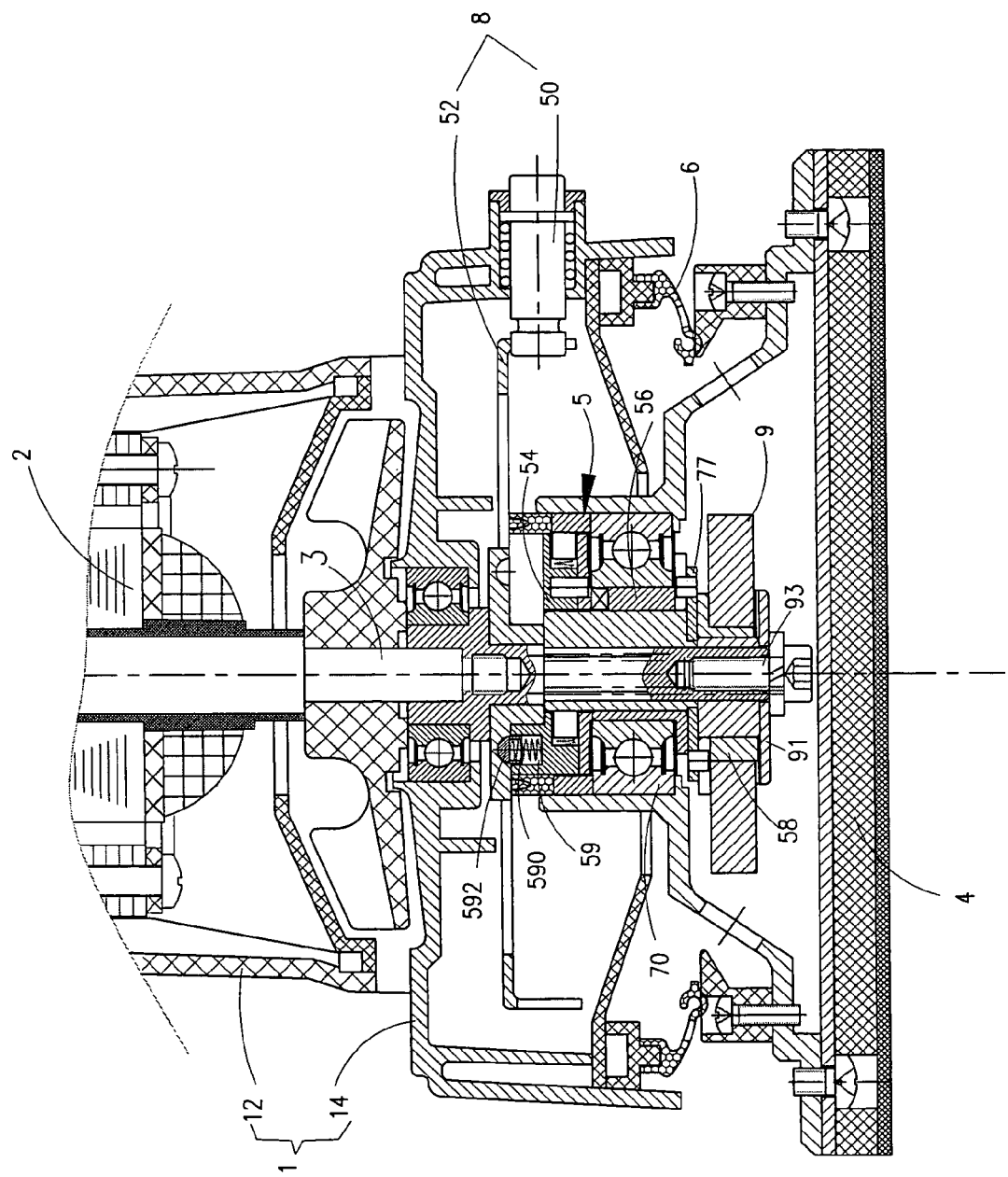
FIG. 6 is a sectional view of a sander according to a second embodiment of the present invention.

FIG. 6 illustrates a rotary sander of a second embodiment of the present invention. The parts in the second embodiment which are the same as or similar to the parts in the first embodiment will not be described in detail and will adopt the same numeral. The rotary sander of the second embodiment comprises an upper housing part 12, a lower housing part 14, a motor 2 vertically disposed inside the housing 1, a principle drive shaft 3, a sanding plate 4 and an eccentric stroke adjusting mechanism 5. The eccentric stroke adjusting mechanism 5 comprises an overrun clutch 54, a first eccentric member 56 and a second eccentric member 58. A coupling member 77 couples the first eccentric member 56 and the second eccentric member 58. The sanding plate 4 of the second embodiment is a single disk. A balancing block 9 is directly attached to a second eccentric sleeve 75 of the second eccentric member 58 (in place of the annular inner plate 44 and the bearing of the first embodiment).

In the second embodiment, no balancing drum 55 is present. Instead the overrun clutch 54 engages the chuck 52 directly and a recess 59 is present on the upper surface of an annular main body 60 of the overrun clutch 54. A spring 590 and a ball head locating post 592 connected to the spring 590 are disposed in the recess 59. The ball head locating post 592 extends partially into a location hole 525 under the force of the spring 590 to restrainedly couple the overrun clutch 54 and the chuck 52.

Figure 9:
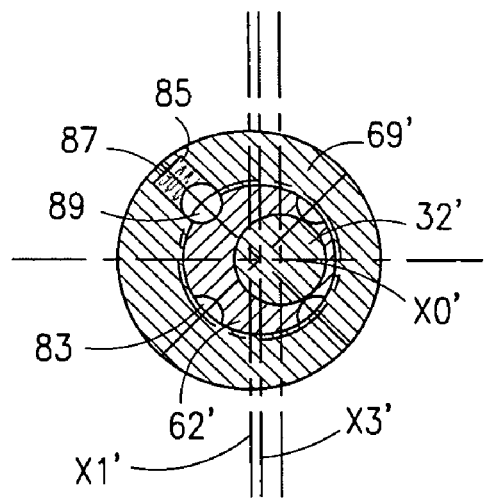
FIG. 9 is a sectional view taken along line N-N shown in FIG. 7.
Figure 4:
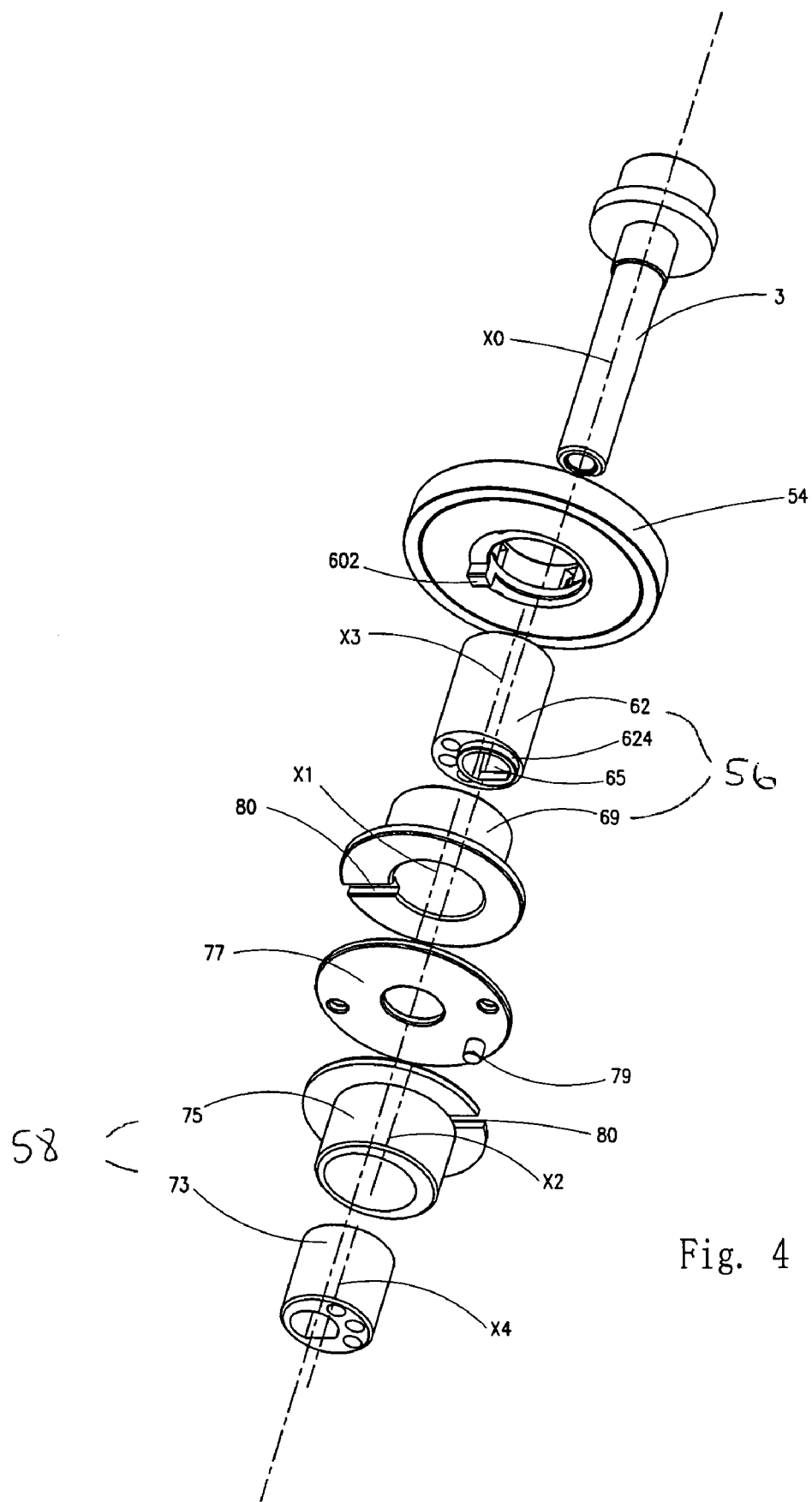
FIG. 4 is an exploded perspective view of the eccentric stroke adjusting mechanism shown in FIG. 1.
Figure 5:
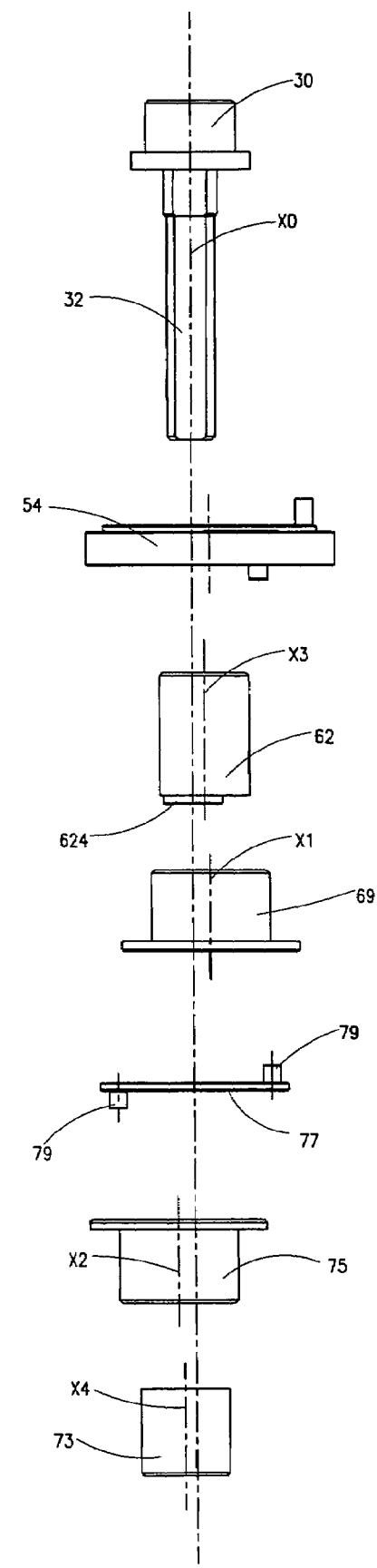
FIG. 5 is a front plan view of FIG. 4.
Figure 7:
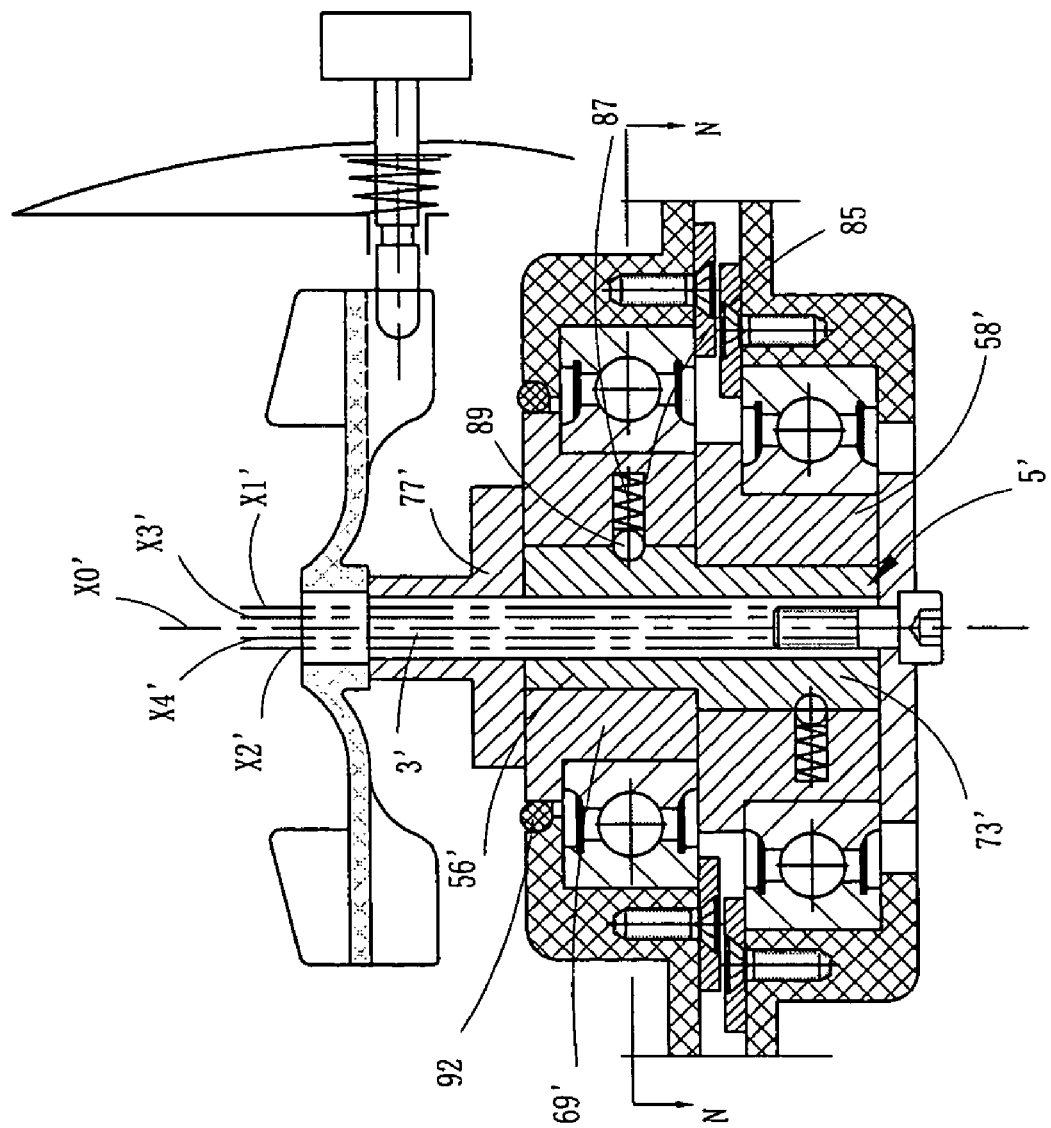
FIG. 7 is a sectional view of a sander according to a third embodiment of the present invention.
Figure 8:
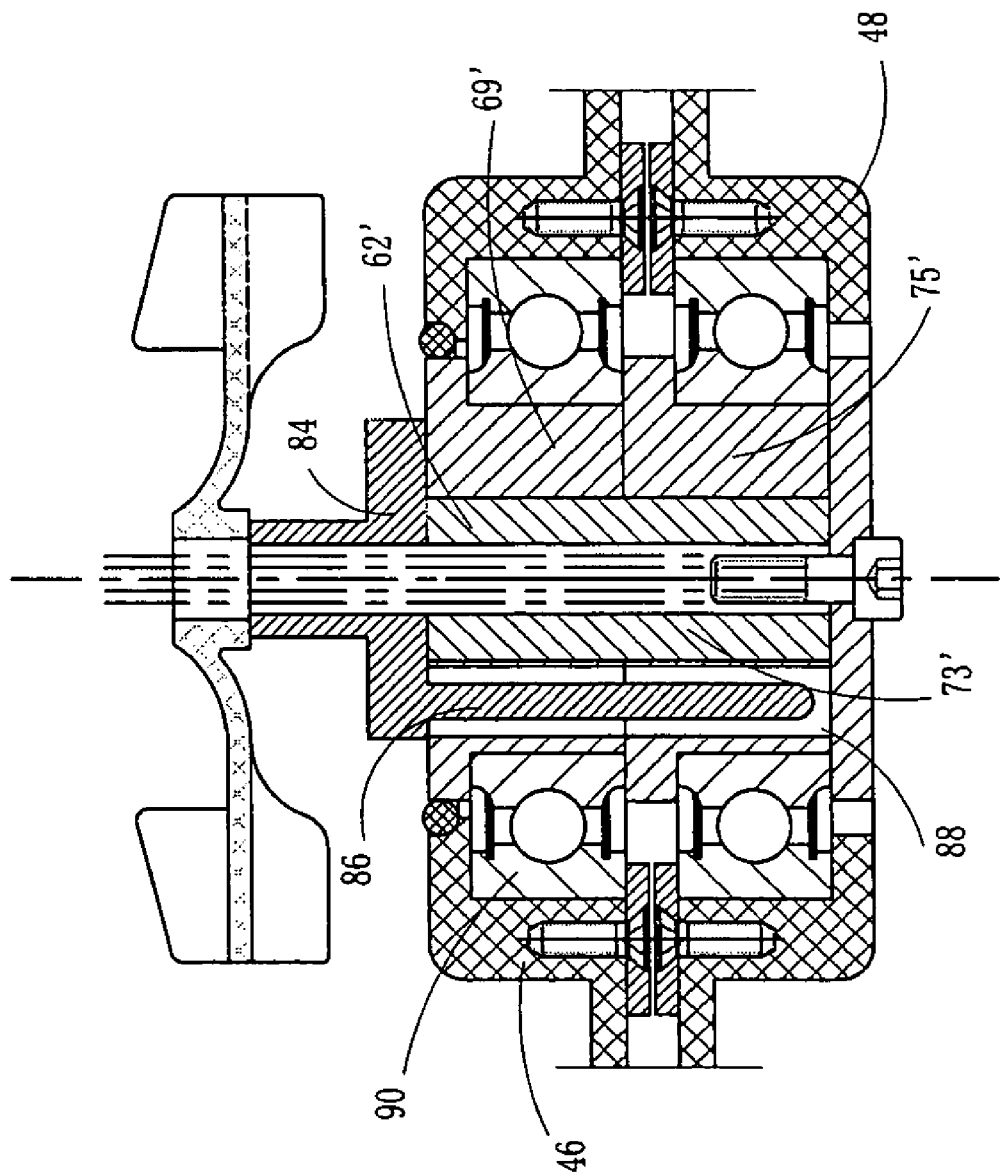
FIG. 8 is a sectional view from another direction of the sander according to the third embodiment of the present invention.

FIGS. 7-9 illustrate an eccentric stroke adjusting mechanism 5' of a third embodiment of the present invention (similar to the eccentric stroke adjusting mechanism 5 of the first and second embodiment described above) for use in a power tool having a principle drive shaft 3'. The eccentric stroke adjusting mechanism 5' comprises a first eccentric member 56' mounted on the principle drive shaft 3', a second eccentric member 58' mounted on the principle drive shaft 3' and a coupling member 77' for coupling the first eccentric member 56' and the second eccentric member 58'.

The first eccentric member 56' has a first central axis X1'. The second eccentric member 58' has a second central axis X2'. The eccentric stroke of the first central axis X1' and the second central axis X2' with respect to a central axis X0' of the principle drive shaft 3' is adjustable. The first eccentric member 56' comprises a first eccentric shaft 62' mounted radially on the principle drive shaft 3' and a first eccentric sleeve 69' rotatable with respect to the principle drive shaft 3'. The second eccentric member 58' comprises a second eccentric shaft 73' mounted on the principle drive shaft 3' and a second eccentric sleeve 75' rotatable with respect to the principle drive shaft 3'. A central axis X3' of the first eccentric shaft 62' and a central axis X4' of the second eccentric shaft 73' are eccentric with respect to the central axis X0 of the principle drive shaft 3' and on opposite sides thereof. The first eccentric sleeve 69' and the second eccentric sleeve 75' are separately rotatably mounted on the first eccentric shaft 62' and the second eccentric shaft 73'. The central axis of the first eccentric sleeve 69' defines in practice the central axis X1' of the first eccentric member 56'. The central axis of the second eccentric sleeve 75' defines in practice the central axis X2' of the second eccentric member 58'. The central axis X1' of the first eccentric sleeve 69' is eccentric with respect to the central axis X3' of the first eccentric shaft 62' and the central axis X0' of the principle drive shaft 3'. The central axis X2' of the second eccentric sleeve 75' is eccentric with respect to the central axis X4' of the second eccentric shaft 73' and the central axis X0' of the principle drive shaft 3'. The central axes X1' and X2' are on opposite sides of the central axis X0'.

A plurality of locating sockets 83 are formed on the outer surface of the first eccentric shaft 62' and the second eccentric shaft 73'. A plurality of radial receiving recesses 85 are formed on the inner circumferential surface of the first eccentric sleeve 69' and of the second eccentric sleeve 75'. The receiving recesses 85 each have an elastic element 87 seated therein and a locating post 89 is connected to the elastic element 87. The locating post 89 can be selectively received in one of the corresponding locating sockets 83 so as to restrainedly couple the first and the second eccentric sleeve 69', 75' with the first and the second eccentric shaft 62', 73' respectively.

The coupling member 77' has an operating body 84 rotatably mounted on the principle drive shaft 3' and an extension pin 86 extending downwardly therefrom. Each of the first and the second eccentric sleeve 69', 75' have an axial receiving bore 88 to accommodate the extension pin 86. The diameter of the receiving bore 88 approximates to the diameter of the extension pin 86. The length of the receiving bore 88 is longer than the length of the extension pin 86.

Sanding plates 46 and 48 are coupled to the first eccentric sleeve 69' and the second eccentric sleeve 75' via a bearing 90. A seal ring 92 is interposed between the sanding plate 46 and the first eccentric sleeve 69'.

The operating body 84 of the coupling member 77' can be manually rotated to allow the eccentric stroke of the sanding plates 46 and 48 to be adjusted. The principle of adjustment is the same as described above for the first and the second embodiment.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An eccentric stroke adjusting mechanism for use in a power tool, comprising:
a principle drive shaft having a central axis;
a first eccentric member mounted radially on the principle drive shaft, the first eccentric member having a first central axis;
a second eccentric member mounted radially on the principle drive shaft, the second eccentric member having a second central axis;
a coupling member for coupling the first eccentric member to the second eccentric member, wherein the eccentricity of the first central axis and the eccentricity of the second central axis with respect to the central axis of the principle drive shaft are adjustable;
wherein the central axis, the first central axis, and the second central axis are in a common plane; and
wherein the first eccentric member has a first eccentric sleeve, the second eccentric member has a second eccentric sleeve and the first eccentric sleeve and the second eccentric sleeve are rotatable relative to the principle drive shaft, wherein a central axis of the first eccentric sleeve is the first central axis of the first eccentric member and a central axis of the second eccentric sleeve is the second central axis of the second eccentric member.

2. The eccentric stroke adjusting mechanism according to claim 1, wherein the first eccentric member has a first eccentric shaft, the second eccentric member has a second eccentric shaft and the first eccentric shaft and second eccentric shaft are securely mounted radially on the principle drive shaft, wherein the first eccentric sleeve and the second eccentric sleeve are rotatably mounted on the first eccentric shaft and the second eccentric shaft respectively,
wherein a central axis of the first eccentric shaft and a central axis of the second eccentric shaft are eccentric with respect to the central axis of the principle drive shaft,
wherein the central axis of the first eccentric sleeve is eccentric with respect to the central axis of the first eccentric shaft and to the central axis of the principle drive shaft, and
wherein the central axis of the second eccentric sleeve is eccentric with respect to the central axis of the second eccentric shaft and to the central axis of the principle drive shaft.

3. The eccentric stroke adjusting mechanism according to claim 2, wherein the central axis of the first eccentric sleeve and the central axis of the second eccentric sleeve are on opposite sides of the central axis of the principle drive shaft.

4. The eccentric stroke adjusting mechanism according to claim 2, wherein the central axis of the first eccentric shaft and the central axis of the second eccentric shaft are on opposite sides of the central axis of the principle drive shaft.

5. The eccentric stroke adjusting mechanism according to claim 2, wherein the coupling member is securely mounted on the first eccentric shaft and has a first pin on an upper surface and a second pin on a lower surface, wherein each of the first eccentric sleeve and the second eccentric sleeve has a radial slot to receive the first pin and second pin respectively, wherein the width of the slot approximates to the diameter of the pin.

6. The eccentric stroke adjusting mechanism according to claim 2, wherein the coupling member has an operating body rotatably mounted on the principle drive shaft and an extension pin extending axially from the operating body, wherein each of the first eccentric sleeve and the second eccentric sleeve has a receiving bore for receiving the extension pin, wherein the diameter of the receiving bore approximates to the diameter of the extension pin and the receiving bore is longer than the extension pin.

7. The eccentric stroke adjusting mechanism according to claim 2, wherein a plurality of locating sockets are formed on the outer surface of the first eccentric shaft and of the second eccentric shaft and a plurality of receiving recesses are formed on the inner circumferential surface of the first eccentric sleeve and of the second eccentric sleeve, wherein in each receiving recess is seated an elastic element connected to a locating post, wherein each locating post is selectively received in a locating socket so as to restrainedly couple the first and the second eccentric sleeve with the first and the second eccentric shaft respectively.

8. A power tool comprising:
a housing;
a rotary motor in the housing; and
an eccentric stroke adjusting mechanism comprising:
a principle drive shaft with a central axis, wherein the principle drive shaft is in use rotationally driven by the rotary motor;
a first eccentric member mounted radially on the principle drive shaft, the first eccentric member having a first central axis;
a second eccentric member mounted radially on the principle drive shaft, the second eccentric member having a second central axis;
a coupling member for coupling the first eccentric member to the second eccentric member, wherein the eccentricity of the first central axis and the eccentricity of the second central axis with respect to the central axis of the principle drive shaft are adjustable;
wherein the central axis, the first central axis, and the second central axis are in a common plane; and
wherein the first eccentric member has a first eccentric sleeve, the second eccentric member has a second eccentric sleeve and the first eccentric sleeve and the second eccentric sleeve are rotatable relative to the principle drive shaft, wherein a central axis of the first eccentric sleeve is the first central axis of the first eccentric member and a central axis of the second eccentric sleeve is the second central axis of the second eccentric member.

9. The power tool according to claim 8, further comprising a first sanding plate connected or coupled to the first eccentric member.

10. The power tool according to claim 9, further comprising a second sanding plate connected or coupled to the second eccentric member.

11. The power tool according to claim 10, further comprising a clutch securely mounted radially on the first eccentric member, wherein the clutch comprises an annular main body, wherein the annular main body has an inner circumferential surface with a plurality of first truncated conical recesses formed thereon and an outer circumferential surface with a plurality of second truncated conical recesses formed thereon, wherein in each first truncated conical recess and second truncated conical recess is seated an elastic element connected to a roller whereby the elastic element urges the roller outwardly, wherein when in use the principle drive shaft rotates the rollers in the inner circumferential surface of the clutch securely engage the principle drive shaft and the rollers in the outer circumferential surface of the clutch disengage the first sanding plate.

12. An eccentric stroke adjusting mechanism for use in a power tool comprising:
   a principle drive shaft having a central axis;
   a first eccentric member mounted radially on the principle drive shaft, the first eccentric member having a first central axis;
   a second eccentric member mounted radially on the principle drive shaft, the second eccentric member having a second central axis;
   a coupling member for coupling the first eccentric member to the second eccentric member, wherein the eccentricity of the first central axis and the eccentricity of the second central axis with respect to the central axis of the principle drive shaft are adjustable, wherein the first central axis and the second central axis are symmetrically distributed around the central axis; and
   wherein the first eccentric member has a first eccentric sleeve, the second eccentric member has a second eccentric sleeve and the first eccentric sleeve and the second eccentric sleeve are rotatable relative to the principle drive shaft, wherein a central axis of the first eccentric sleeve is the first central axis of the first eccentric member and a central axis of the second eccentric sleeve is the second central axis of the second eccentric member.

13. A power tool comprising
   a housing;
   a rotary motor in the housing; and
   an eccentric stroke adjusting mechanism comprising;
   a principle drive shaft with a central axis, wherein the principle drive shaft is in use rotationally driven by the rotary motor;
   a first eccentric member mounted radially on the principle drive shaft, the first eccentric member having a first central axis;
   a second eccentric member mounted radially on the principle drive shaft, the second eccentric member having a second central axis;
   a balancing block connected or coupled to the second eccentric member;
   a coupling member for coupling the first eccentric member to the second eccentric member, wherein the eccentricity of the first central axis and the eccentricity of the second central axis with respect to the central axis of the principle drive shaft are adjustable; and
   wherein the central axis, the first central axis, and the second central axis are in a common plane.

14. A power tool comprising:
   a housing;
   a rotary motor in the housing;
   a locking device for locking the principle drive shaft; and
   an eccentric stroke adjusting mechanism comprising:
   a principle drive shaft with a central axis, wherein the principle drive shaft is in use rotationally driven by the rotary motor;
   a first eccentric member mounted radially on the principle drive shaft, the first eccentric member having a first central axis;
   a second eccentric member mounted radially on the principle drive shaft, the second eccentric member having a second central axis;
   a coupling member for coupling the first eccentric member to the second eccentric member, wherein the eccentricity of the first central axis and the eccentricity of the second central axis with respect to the central axis of the principle drive shaft are adjustable; and wherein the central axis, the first central axis, and the second central axis are in a common plane.

15. The power tool according to claim 14, wherein the locking device comprises:
   a chuck mounted radially on the principle drive shaft, wherein the chuck has a skirt extending axially downwardly from its circumferential edge, wherein a plurality of recesses are located around the skirt; and
   a locking member attached to the housing, wherein the locking member is selectively insertable into a recess to lock the chuck and prevent the principle drive shaft from rotating.

16. The power tool according to claim 15, further comprising a balancing drum, wherein the chuck has a central aperture surrounded by an eccentric hub and the balancing drum is securely mounted on the eccentric hub.

17. The power tool according to claim 15, wherein when the principle drive shaft is locked by the locking device to adjust the eccentric stroke of the sanding plate, the first sanding plate securely engages the rollers seated in the outer circumferential surface of the clutch and the rollers seated in the inner circumferential surface of the clutch disengage the principle drive shaft.

18. The power tool according to claim 17, further comprising an outer race mounted radially on the annular main body between the clutch and the first sanding plate.

19. The power tool according to claim 14, further comprising:
   a first sanding plate connected to the first eccentric member;
   a second sanding plate connected to the second eccentric member; and
   a balancing block connected to the second eccentric member.

* * * * *